April 15, 1952     T. H. SHERMAN     2,592,608
HEATER
Filed Dec. 1, 1945     5 Sheets-Sheet 1

INVENTOR
TRACY H. SHERMAN
BY
E. Francis Wentworth Jr.
ATTORNEY

April 15, 1952     T. H. SHERMAN     2,592,608
HEATER
Filed Dec. 1, 1945     5 Sheets—Sheet 3
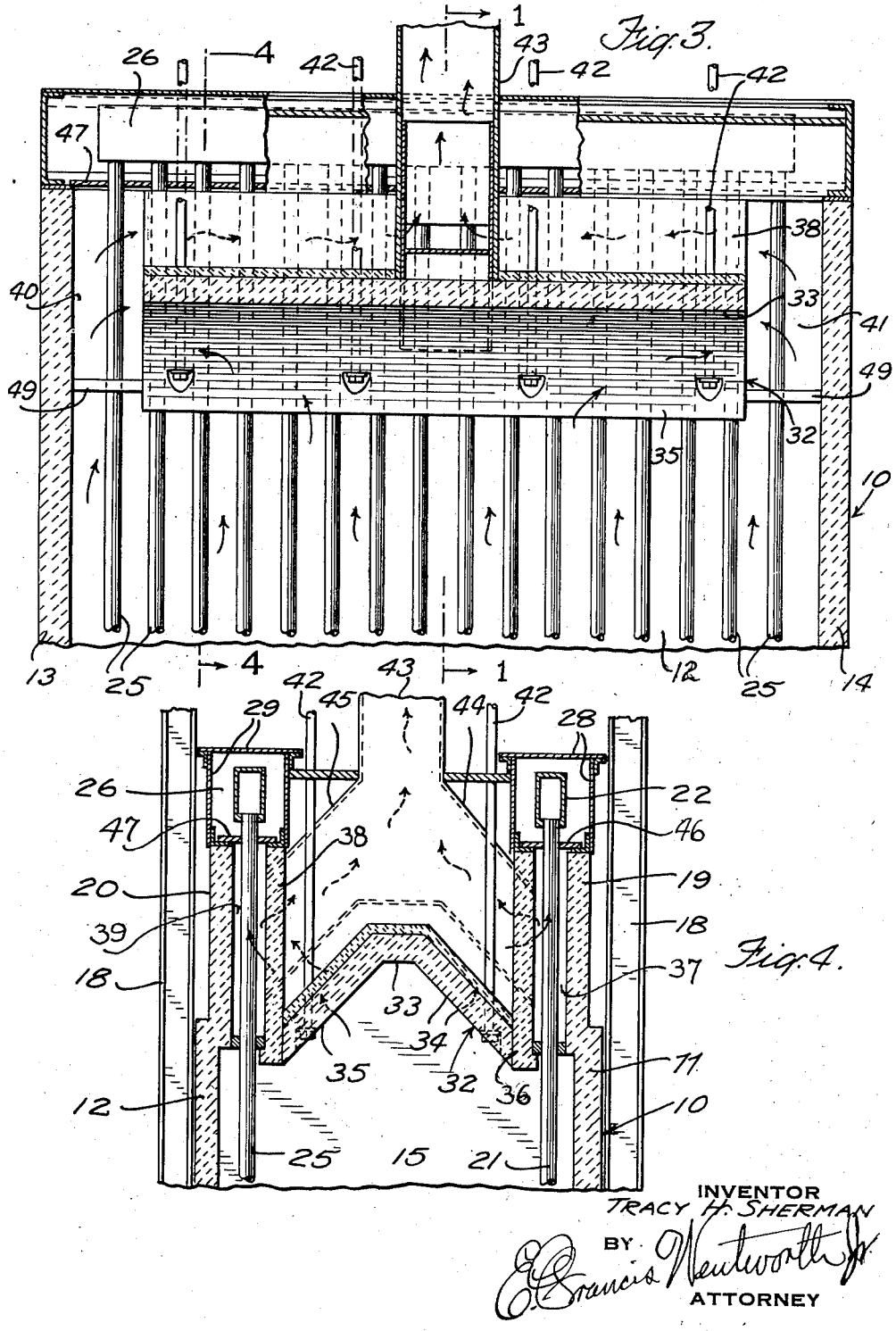

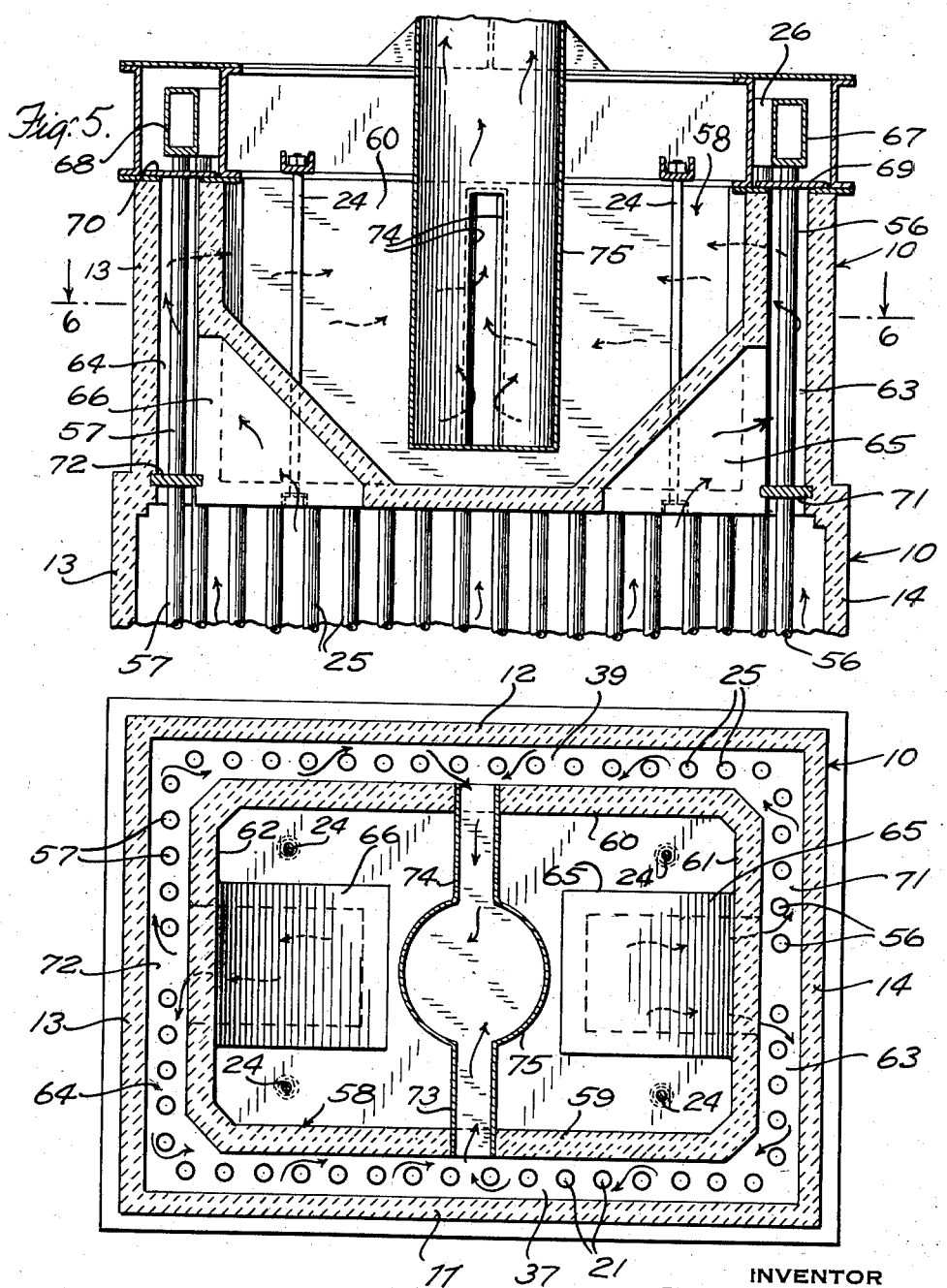

April 15, 1952     T. H. SHERMAN     2,592,608
HEATER

Filed Dec. 1, 1945     5 Sheets-Sheet 5

INVENTOR
TRACY H. SHERMAN.
BY E. Francis Wentworth Jr.
ATTORNEY

Patented Apr. 15, 1952

2,592,608

UNITED STATES PATENT OFFICE 2,592,608

HEATER

Tracy H. Sherman, South Nyack, N. Y., assignor to Foster Wheeler Corporation, New York, N. Y., a corporation of New York Application December 1, 1945, Serial No. 632,159

6 Claims. (Cl. 122—356)

This invention relates to heaters and more particularly pertains to fluid heating apparatus of the type in which the fluid to be heated is passed through tubular members in heat exchange relationship with a stream of products of combustion.

The present invention provides a heater used in the conversion of fluids, particularly in the conversion of hydrocarbon oil. Uniform heating of the tubular members both circumferentially and longitudinally is provided in the heater of the present invention which heater is efficient and of relatively simple construction.

The invention will be understood from the following description when considered in connection with the accompanying drawings forming a part thereof, and in which:

Fig. 3 is a longitudinal sectional view taken on the line 3—3 of Fig. 1;

Fig. 4 is a sectional view taken on the line 4—4 of Fig. 3;

Fig. 5 is a view somewhat similar to Fig. 3 but of another embodiment of the invention;

Fig. 6 is a sectional plan view taken on the line 6—6 of Fig. 5;

Like characters of reference refer to the same or to similar parts throughout the several views.

Figure 1:
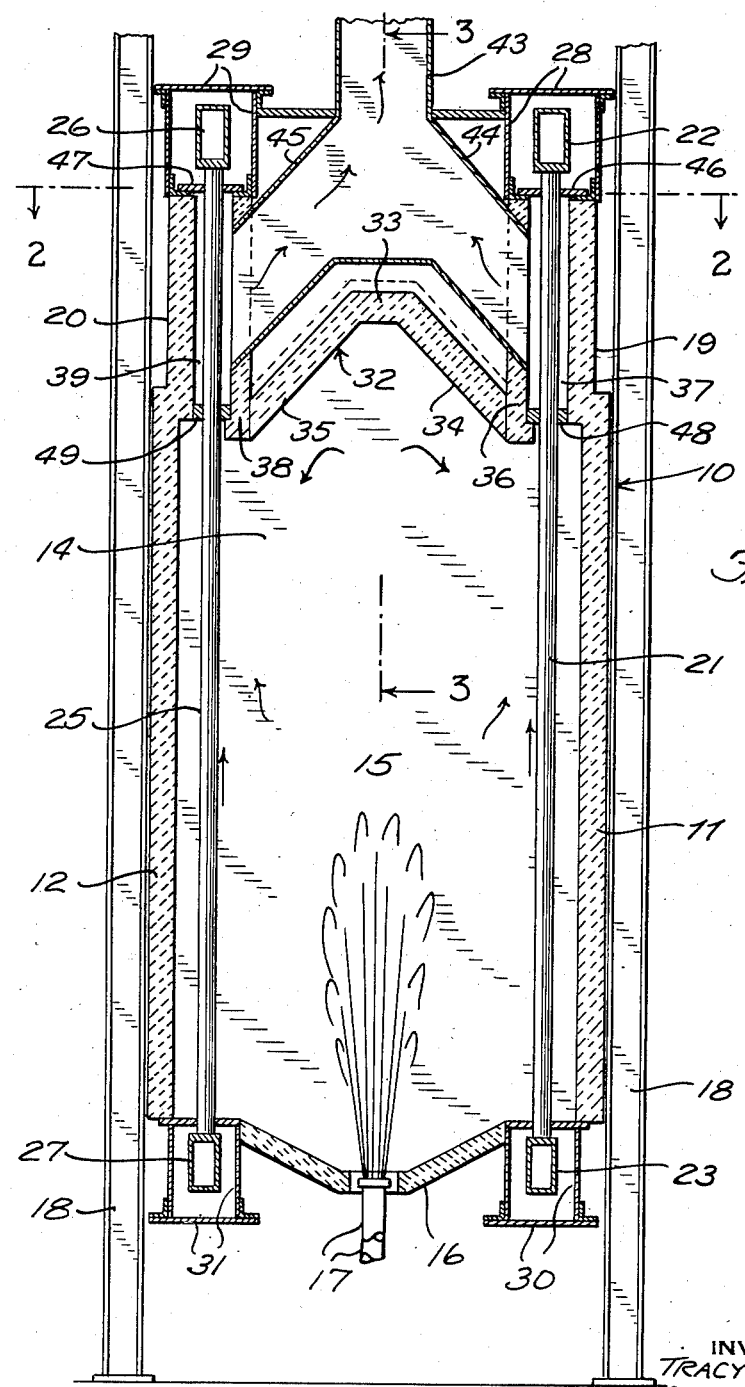
Fig. 1 is a vertical sectional view of a heater embodying the invention taken on the line 1—1 of Fig. 3.

Referring to the drawings, reference character 10 designates the setting of a heater suitable for the heating of liquids such as hydrocarbon oils and the like, although it is not limited to the heating of such oils but is useful in the heating of a wide variety of liquids, vapors and gases. The setting 10, as shown, is generally rectangular shaped in transverse cross section and comprises oppositely disposed refractory side walls 11 and 12 and opposite end walls 13 and 14, said side and end walls forming a combustion chamber 15. A depressed floor 16 is at the bottom of the chamber and has, as shown, horizontally spaced burners 17 disposed therein intermediate the side walls 11 and 12, said burners being so positioned as to direct a stream of products of combustion generally vertically upwardly in the chamber. The heater is supported by a plurality of girders 18. The upper portion 19 of the wall 11 and the upper portion 20 of the wall 12 are both offset inwardly toward the chamber 15 from the lower portion of said walls below said upper portions.

In the embodiment of the invention disclosed in Figs. 1 to 4, a row of spaced generally vertically extending tubular members 21 is disposed along the side wall 11 in spaced relationship to the inner surface of the upper portion 19 of the wall 11 and the inner surface of the remainder of said wall. The tubular members 21 are connected to an upper header 22 at one end thereof and to a lower header 23 at the opposite end. A similar row of tubular members 25 is disposed along the side wall 12 in spaced relationship to the inner surface of both the upper and lower portions of said side wall. The tubular members 25 are connected at the upper end to a header 26 and at the lower end to a header 27. Upper headers 22 and 26 are enclosed in header boxes 28 and 29, respectively, while lower headers 23 and 27 are enclosed respectively in similar header boxes 30 and 31. Tubular members 21 and 25 are substantially equidistant from the burners 17.

A combustion gas directing baffle 32 is disposed in the upper part of the chamber 15 in the path of flow of the gases of combustion from the burners 17. The baffle comprises a substantially horizontally extending central portion 33 and side sections 34 and 35 which extend obliquely downwardly from the central portion. A substantially vertically extending wall 36 adjoins the section 34 and extends upwardly adjacent the upper portion 19 of the wall 11, the wall 36 being in spaced relationship with the tubular members 21 and the upper portion of the wall 19 so as to form a convection heating chamber 37. A wall 38 similar to the wall 36 adjoins the sections 35 and extends upwardly therefrom in spaced relationship to the upper portion 20 of the wall 12 and the tubular members 25 to form a convection heating chamber 39. The baffle 32 and the walls 36 and 38 extend lengthwise of the chamber 15 to a point short of the end walls 13 and 14 to form gas passages 40 and 41 adjacent walls 13 and 14, respectively, which passages are in communication with the furnace chamber 15 and also with the convection chambers 37 and 39. The baffle 32 and walls 36 and 38 may be formed of a single piece of refractory or may be formed of separate pieces, as shown, which are secured together in any desired manner. Supporting rods 42, which are connected at one end to the baffle 32 and at the opposite end to the girders 18 by suitable crossbeams, not shown, support the baffle and maintain it in position. Convection chambers 37 and 39 are in communication with a flue 43 through gas outlet conduits 44 and 45, respectively, which conduits are in communication with the convection chambers 37 and 39 at a point intermediate the opposite ends of said chambers. The convection chambers 37 and 39 are closed at the top thereof by upper tube sheets 46 and 47, respectively, and are closed at the bottom thereof by lower tube sheets 48 and 49, respectively.

Figure 2:
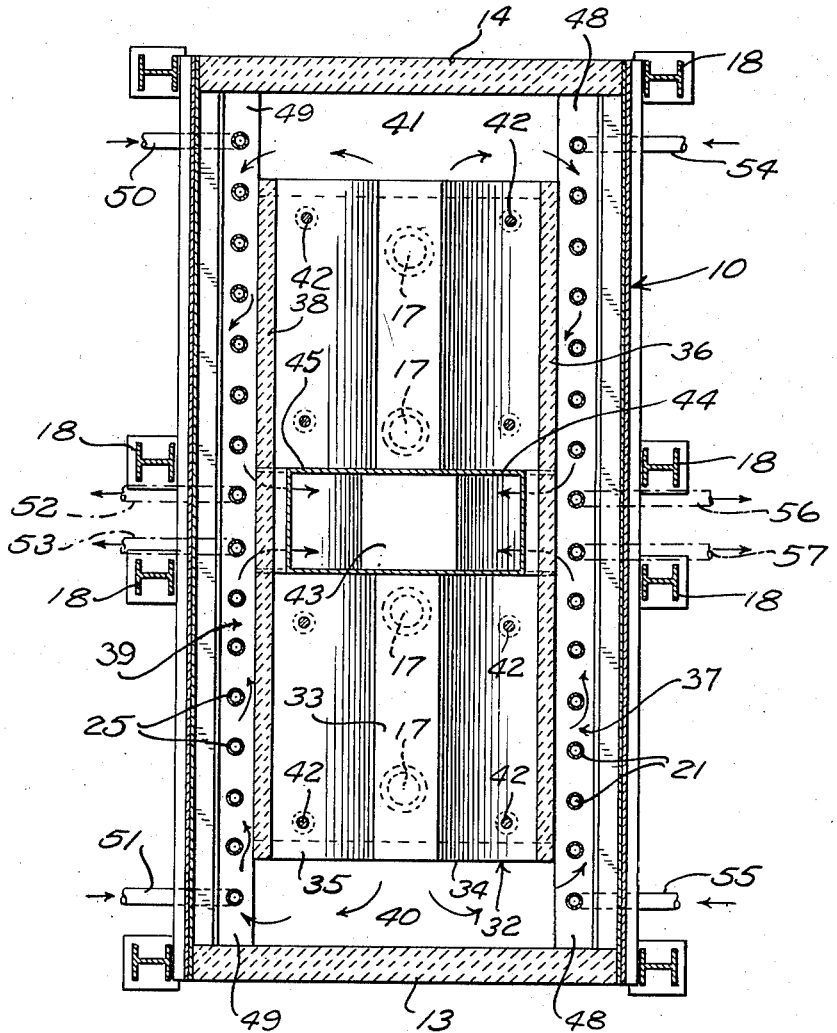
Fig. 2 is a sectional plan view taken on the line 2—2 of Fig. 1.

The rows of tubular members 21 and 25 may be arranged in as many passages as desired. As shown in Fig. 2, oil enters the row of tubular members 25 through the inlet conduits 50 and 51 at opposite ends of the row and is discharged from the discharge outlets 52 and 53, respectively, at intermediate points in the row, while fluid to be heated in the row of tubular members 21 enters said row through the inlet conduits 54 and 55 at opposite ends of the row and is discharged through outlet conduits 56 and 57, respectively, at intermediate points in the row.

In operation, gases of combustion from the burners 17 flow upwardly in the chamber 15 and in heat exchange relationship with the portion of the tubular members 21 and 25 below the baffle 32. The gases of combustion impinge upon the baffle 32 and are directed downwardly by the sections 34 and 35 and toward said tubular members. The gases thereafter flow outwardly of the chamber 15 through the gas passages 40 and 41. Gases from the passages 40 and 41 pass into the convection chambers 37 and 39, flowing substantially horizontally in said chambers over and in heat exchange relationship with the upper portion of the tubular members 21 and 25 from points adjacent the end walls 13 and 14, respectively, toward the gas outlet conduits 44 and 45 thereafter to enter said conduits and flow outwardly through the flue 43. Temperature of the gases in the convection chambers 37 and 39 may be controlled to control the heating of fluid in the tubular members 21 and 25 by admitting cooling air to said chambers.

In the form of the invention disclosed in Figs. 5 and 6, the tubular members are disposed along the end walls 13 and 14 as well as along the side walls 11 and 12. The wall 14 has a row of tubular members 56 disposed in spaced relationship thereto, while a row of tubular members 57 is disposed along the side wall 13 in spaced relationship thereto. In this embodiment of the invention, the upper portion of the walls 13 and 14 have an offset portion similar to the portions 19 and 20 of the side walls 11 and 12. A baffle 58 is positioned in the upper part of the chamber 15 and is supported by rods 24. Baffle 58 has opposite side walls 59 and 60 and opposite end walls 61 and 62, the side walls 59 and 60 being in spaced relationship to the upper portion of the side walls 111 and 12 to form the convection chambers 37 and 39, while the end walls 61 and 62 are in spaced relationship to the upper portion of the end walls 14 and 13 to form convection heating chambers 63 and 64. The convection chambers 37 and 39 are in communication at opposite ends thereof with the chambers 63 and 64. The baffle 58 has gas outlet passages 65 and 66 in communication with the upper part of the chamber 15 and with the lower part of the convection chambers 63 and 64, respectively, intermediate the opposite ends thereof. The tubular members 56 and 57 are in communication with upper headers 67 and 68, respectively, which headers are in communication at opposite ends thereof with upper headers 22 and 26 which headers are in communication with the tubular members 21 and 25, respectively. The convection chambers 63 and 64 are closed at the top thereof by the tube sheets 69 and 70, respectively, and are closed at the bottom thereof by the tube sheets 71 and 72, respectively.

Gases from the convection chamber 37 pass outwardly thereof through a gas outlet conduit 73 disposed intermediate the end walls 61 and 62 of the baffle 58, while gases of combustion from the convection chamber 39 flow outwardly thereof through a similar gas outlet conduit 74. The gas outlet conduits 73 and 74 are in communication with a flue 75 through which gases pass outwardly of the setting.

The operation of the form of the invention disclosed in Figs. 5 and 6 is similar to the operation of the form shown in Figs. 1 to 4. Gases flowing substantially vertically upwardly in the chamber 15 pass in heat exchange relationship with the portion of tubular members 21 25, 56 and 57 below baffle 58, thereafter to impinge upon the bottom of the baffle 58 and flow outwardly of the chamber 15 through the outlet passages 65 and 66. Gases flowing through the outlet 65 pass into the convection chamber 63, part of said gases flowing generally horizontally in said chamber in convection heat exchange relationship with the upper portion of some of the tubes 56 and thence into the convection section 37 flowing therein generally horizontally in convection heat exchange relationship with the upper portion of some of the tubes 21, thereafter passing out of the chamber 37 through the gas outlet conduit 73. Other of the gases entering the convection chamber 63 through the outlet passage 65 flow generally horizontally over the upper portion of other of the tubes 56 passing into the convection chamber 39 to flow generally horizontally therein in convection heat exchange relationship with the upper portion of tubular members 25 thereafter passing outwardly of said chamber through the gas outlet conduit 74. Gases flowing outwardly of the chamber 15 through the gas outlet passage 66 enter the convection chamber 64 in which part of said gases flow generally horizontally in the chamber 64 thence into the convection chamber 39 whence they pass into the gas outlet conduit 74 while other of the gases entering the convection chamber 64 from the passage 66 flow horizontally in the chamber 64 thence into the chamber 37 whence they pass into the gas outlet passage 73. The gases flowing in the chamber 63, 64 37 and 39 flow generally horizontally therein and pass in convection heat exchange relationship with the upper portion of tubes 56, 57, 21 and 25 in said sections respectively.

Figure 7:
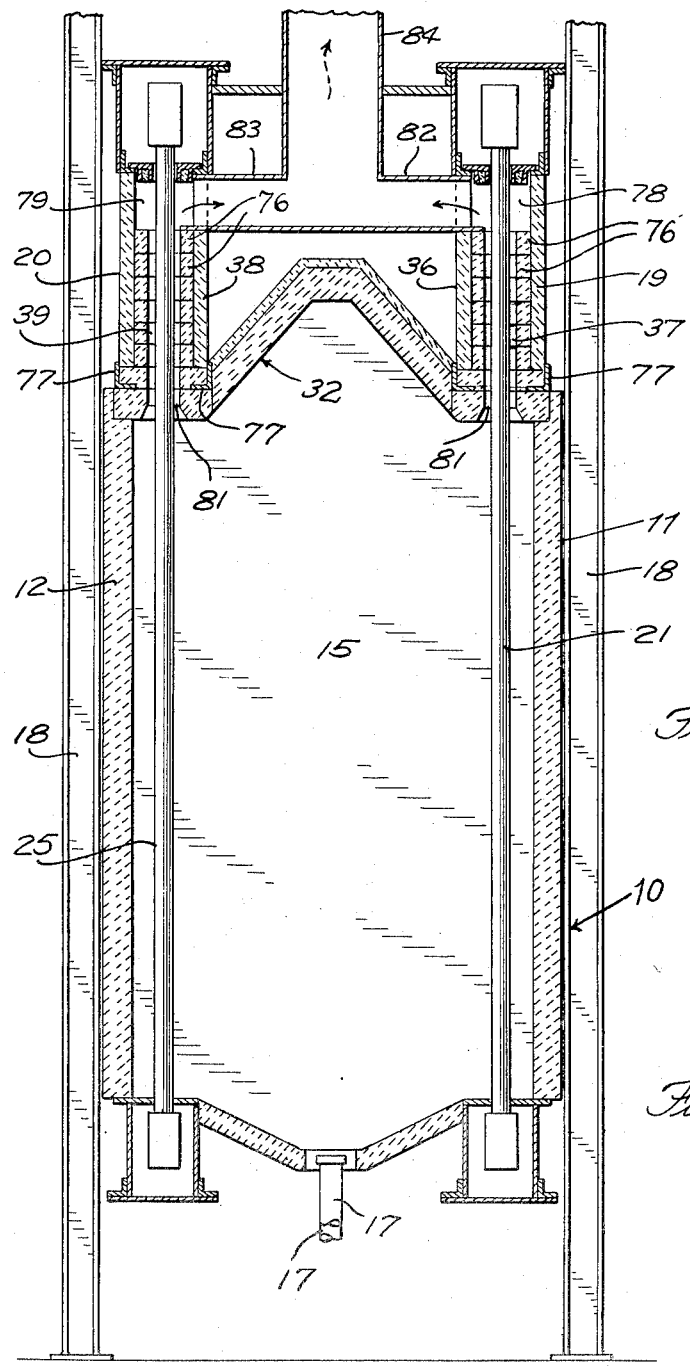
Fig. 7 is a view similar to Fig. 1 but of another embodiment of the invention.
Figure 8:
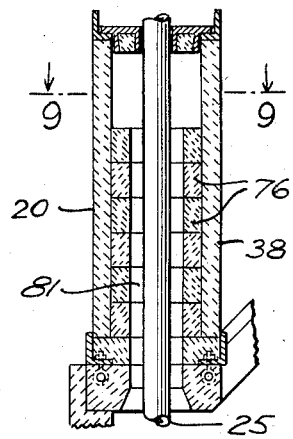
Fig. 8 is an enlarged view of a portion of the upper part of the heater of Fig. 7.
Figure 9:
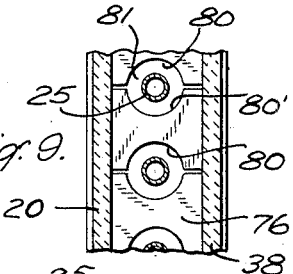
Fig. 9 is a sectional view taken on the line 9—9 of Fig. 8.

The embodiment of the invention shown in Figs. 7 to 9 is somewhat similar to the form of the invention disclosed in Figs. 1 to 4 but the flow of gases of combustion from the furnace chamber 15 in the convection chambers 37 and 39 is partly vertical and partly horizontal. Referring to Fig. 7, the baffle 32 extends the entire length of the chamber 15 instead of terminating short of the end walls as in the form of the invention shown in Figs. 1 to 4 while the lower tube sheets 48 and 49, which form the bottom of the chambers 37 and 39 respectively, are omitted so that gases from the chamber 15 enter chambers 37 and 39 at the bottom thereof to flow vertically upwardly toward the top of said chambers. A plurality of rows of refractory tiles 76 are positioned in the chambers 37 and 39 in superposed relationship to one another adjacent the upper part of tubular members 21 and 25, said tiles being supported at the bottom by angles 77 and extending upwardly in the convection chambers to a point short of the top of said chambers to form a horizontally extending passage 78 adjacent the top of the chamber 37 and a horizontally extending passage 79 adjacent the top of the chamber 39. The chambers 78 and 79 extend horizontally between the opposite end walls 13 and 14 of the heater setting. The tiles 76 are positioned in the spaces between tubes 21 and between tubes 25 and have semi-circular cut-out portions 80 and 80' adjacent the tubes, said cut-out portions being concentric to the tubes and having a larger radius than the radius of the tubes so that a vertical circular passage 81 is formed around each tube, the inner surface of said vertical passage being concentric to the tube, extending around the entire periphery of a tube closely adjacent thereto. The horizontally extending passages 78 and 79 are in communication intermediate the opposite ends thereof with gas outlet conduits 82 and 83 respectively, which conduits are connected to a flue 84.

In operation, the gases of combustion flowing generally vertically upwardly in the chamber 15 in heat exchange relationship with the tubular members 21 and 25 in said chamber, impinge upon the baffle 32, the oblique side sections 34 and 35 directing the gases toward tubes 21 and 25, respectively, and toward the inlet to the vertical passages 81 around the tubes 21 and 25. Gases from the chamber 15 enter the passages 81 and flow vertically upwardly therein in heat exchange relationship with the portion of the tubular members in the chambers 37 and 39. Since the passages 81 are circular and concentric to the tubes which they surround, heat flows evenly around the entire circumference of the portion of each tube, within the passages. Heat is radiated evenly from the wall of each passage to the entire circumference of the tube which it surrounds. Gases from the passages 81 flow into the horizontally extending passages 78 and 79 thereafter to pass in a general horizontal direction in heat exchange relationship with the portion of the tubular members 21 and 25 in the passages 78 and 79 toward the gas outlet conduits 82 and 83, respectively. From the conduits 82 and 83 the gases flow outwardly of the setting through the flue 84.

Figure 10:
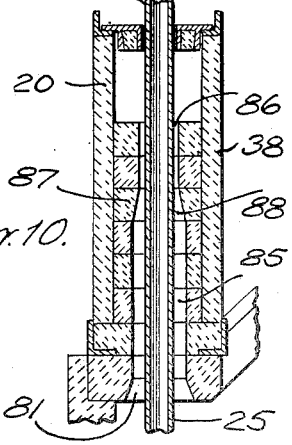
Fig. 10 is a view similar to Fig. 8 but of a further embodiment of the invention.

In the embodiment of the invention shown in Fig. 10 which is somewhat similar to the embodiment shown in Figs. 7 to 9, the semi-circular cut-out portions 80 and 80' of the tiles 76 are of larger radius in the lowermost tiles of each row than the radius of the cut-out portions 80 and 80' of the uppermost tiles of each row. The passage 81 will, therefore, have a lower portion 85 of greater diameter than the upper portion 86 thereof. The cut-out portions 80 and 80' of an intermediate tile 87 have a tapered surface forming a frusto-conical shaped passage 88 between the lower portion 85 and the upper portion 86 of the passage 81. In this form of the invention, as the gases lose heat in flowing through the passages 81, the area of said passages decreases thereby increasing the mass velocity of the gases and heat transfer to the portion of the tubular members in the upper portion 86 of the passage. As in the form of the invention shown in Figs. 7 to 9, the passage 81 is concentric to the tube which passes through it, the inner surface of said vertical passage extending around the entire periphery of the tubular member closely adjacent thereto.

Changes may be made in the form, location and relative arrangement of the several parts of the heater disclosed and many embodiments of the invention may be made without departing from the principles thereof. It will be understood that the invention is not to be limited excepting by the scope of the appended claims.

What is claimed is:

1. A furnace for heating fluids comprising a setting having spaced side walls and spaced end walls forming a rectangular shape furnace chamber, a row of spaced generally vertically extending tubular members in the chamber along at least one wall thereof and in spaced relationship therewith, a passage wall extending along said at least one wall to points short of the setting walls at the opposite ends of said one wall and in spaced relationship to said at least one wall and said row of tubular members, the passage wall being disposed adjacent one end of the tubular members on the furnace chamber side thereof thereby forming in part a narrow gas passage around said one end portion of the row of tubular members, partition means at the top and bottom of the passage closing the passage along said top and bottom thereby separating said passage from the furnace chamber, means for producing a stream of products of combustion which flows generally vertically and mainly in radiant heat exchange relationship with the portion of the tubular members in said furnace chamber, a baffle adjacent said passage wall and in the path of flow of said stream of gases of combustion, said baffle extending in the same direction as the row of tubes to points short of the walls of said setting at the opposite ends of said one wall, the baffle being formed to direct gases toward a portion of the tubular members in the furnace chamber, gas outlet means for the furnace in communication with said gas passage intermediate the opposite ends thereof, the arrangement being such that gases from the furnace chamber enter said gas passage adjacent said walls at opposite ends of said one wall and flow generally horizontally mainly in convection heat exchange relationship with the portion of the tubular members in said gas passage in flowing to the gas outlet means for the furnace.

2. A furnace for heating fluids comprising a setting having spaced side walls and spaced end walls forming a rectangular shaped furnace chamber, a row of spaced generally vertically extending tubular members in the chamber along at least one wall thereof and in spaced relationship therewith, a passage wall extending along said at least one wall to points short of the setting walls at the opposite ends of said one wall and in spaced relationship to said at least one wall and said row of tubular members, the passage wall being disposed adjacent the upper end of the tubular members on the furnace chamber side thereby forming in part a narrow gas passage around said upper end portion of the row of tubular members, partition means at the top and bottom of the passage closing the passage along said top and bottom thereby separating said passage from the furnace chamber, burner means at the lower end of the furnace chamber disposed to direct a stream of products of combustion generally vertically upwardly in said furnace chamber in heat exchange relationship with the portion of the tubular members in said chamber, a baffle adjacent said passage wall and in the path of flow of said stream of gases of combustion, said baffle extending in the same direction as the row of tubes to points short of the walls of said setting at the opposite ends of said one wall, the baffle being formed to direct gases obliquely downwardly toward a portion of the tubular members in the furnace chamber, gas outlet means for the furnace in communication with said gas passage intermediate the opposite ends thereof, the arrangement being such that gases from the furnace chamber enter said gas passage adjacent said setting walls at opposite ends of said one wall and flow generally horizontally in heat exchange relationship with the portion of the tubular members in said gas passage in flowing to the gas outlet means for the furnace.

3. A furnace for heating fluids comprising a setting having spaced side walls and spaced end walls forming a rectangular shaped furnace chamber, a row of spaced generally vertically extending tubular members disposed in the chamber along opposite side walls and in spaced relationship therewith, means forming a narrow generally horizontally extending gas passage around the upper portion of each of said row of tubular members, said passages comprising a partition wall opposite each side wall substantially parallel to and in spaced relationship with the side wall and the tubular members, said partition walls being disposed on the furnace chamber side of said tubular members, a bottom wall at the bottom of the passage closing the space between each side wall and the partition wall opposite thereto, and a top wall at the top of the passage closing the space between each side wall and the partition wall at the top of the passage, said gas passages having gas inlet openings adjacent the opposite end walls of the setting, burner means in the bottom of said furnace chamber, said burner means being disposed a substantially equal distance from the tubular members of each of said rows and to direct a stream of gases in a general vertically upwardly direction in the furnace chamber in heat exchange relationship with the tubular members in said chamber, gas outlet means for the furnace in communication with each of said horizontal gas passages intermediate the opposite ends of said passages, the arrangement being such that gases from the furnace chamber enter the gas openings of the gas passages and flow in mainly convection heat exchange relationship with the portion of the tubular members in said gas passages in flowing to the gas outlet means for the furnace.

4. A furnace for heating fluids comprising a setting having spaced side walls and spaced end walls forming a rectangular shaped furnace chamber, a row of spaced generally vertically extending tubular members disposed in the chamber along each of said opposite side walls and in spaced relationship therewith, means forming a narrow generally horizontally extending gas passage around the upper portion of each of said rows of tubular members, said passages comprising a partition wall opposite each side wall substantially parallel to and in spaced relationship with the side wall and the tubular members, said partition walls being disposed on the furnace chamber side of said tubular members, a bottom wall at the bottom of the passage closing the space between each side wall and the partition wall opposite thereto, and a top wall at the top of the passage closing the space between each side wall and the partition wall at the top of the passage, said gas passages having gas inlet openings adjacent the opposite end walls of said setting, burner means in the bottom of said furnace chamber, said burner means being disposed a substantially equal distance from the tubular members of each of said rows and positioned to direct a stream of gasses of combustion in a generally vertical upwardly direction in the furnace chamber in heat exchange relationship with the tubular members in said chamber, a baffle at the upper end of the furnace chamber adjacent said passages and in the path of flow of said stream of gases of combustion, said baffle extending in the same direction as the rows of tubular members to points short of the opposite end walls of said setting, the baffle being formed to direct gases downwardly toward a portion of the tubular members in the furnace chamber and toward the opposite end walls of the setting, gas outlet means for the furnace in communication with each of said horizontal gas passages intermediate the opposite ends of said passages, the arrangement being such that gases from the furnace chamber enter the gas openings at opposite ends of the horizontal gas passages and flow generally horizontally in heat exchange relationship with the portion of the tubular members in said gas passages in flowing to the gas outlet means for the furnace.

5. In heating apparatus for heating fluids, a furnace chamber, a plurality of generally vertically extending tubular members adjacent the inner periphery of said chamber and in spaced relationship thereto, means forming a narrow generally horizontally extending gas passage, said passage comprising a side wall coextensive with only a part of said inner periphery, the side wall being positioned opposite and substantially parallel to and in spaced relationship with said inner periphery and the tubular members, and being disposed on the furnace chamber side of the tubular members, a bottom wall at the bottom of the passage extending between said inner periphery of said enclosing wall and said side wall and in fluid-tight relationship therewith thereby closing the space between said periphery and the side wall in a fluid-tight manner, and a top wall at the top of the passage extending between said inner periphery of said enclosing wall and said side wall and in a fluid-tight relationship therewith thereby closing the space between said periphery and the side wall at the top of the passage in a fluid-tight manner, said passage being open at at least one end thereof to provide a gas inlet opening for the passage in communication with the furnace chamber, means for producing a stream of products of combustion which flows generally vertically and mainly in radiant heat exchange relationship with the portion of the tubular members in said furnace chamber, gas outlet means for the heating apparatus in communication with said gas passage so as to receive gases after flow thereof from said gas inlet opening through the passage, the point of communication of the gas outlet means with said passage being horizontally spaced longitudinally of the passage from the gas inlet opening such distance that the gases flow from said inlet opening to said outlet means in a generally horizontal direction in the passage transversely of mainly in convection heat exchange relationship with the portion of the tubular members in said horizontal gas passage, the gases in the passage flowing in a generally horizontal direction.

6. In heating apparatus for heating fluids, a furnace chamber, a plurality of generally vertically extending tubular members spaced from the inner periphery of the chamber and having a portion at least thereof in said chamber, means forming a narrow generally horizontally extending gas passage, said passage comprising a side wall opposite said inner periphery substantially parallel to and in spaced relationship with said inner periphery and the tubular members and being disposed on the furnace chamber side of the tubular members, a bottom wall at the bottom of the passage extending between said inner periphery of said enclosing wall and said side wall and in fluid-tight relationship therewith thereby closing the space between said periphery and the side wall at the bottom of the passage in a fluid-tight manner, and a top wall at the top of the passage extending between said inner periphery of said enclosing wall and said side wall and in a fluid-tight relationship therewith thereby closing the space between said periphery and the side wall at the top of the passage in a fluid-tight manner, said gas passage having the opposite ends thereof open to provide gas inlet openings for the passage in communication with the furnace chamber, means for producing a stream of products of combustion which flows generally vertically and mainly in radiant heat exchange relationship with the portion of the tubular members in said furnace chamber, gas outlet means for heating apparatus in communication with said gas passage intermediate the opposite ends thereof to receive gases after flow thereof in the passage, the arrangement of the gas inlet opening and the gas outlet means being such that the gases in the passage flow transversely of and mainly in convection heat exchange relationship with the portion of the tubular members in said horizontal gas passage, the gases flowing in a generally horizontal direction.

TRACY H. SHERMAN.

REFERENCES CITED

The following references are of record in the file of this patent:

UNITED STATES PATENTS

| Number | Name | Date |
|---|---|---|
| 1,737,173 | Pratt | Nov. 26, 1929 |
| 1,881,275 | Huff | Oct. 4, 1932 |
| 2,228,938 | Wood | Jan. 14, 1941 |
| 2,375,505 | Throckmorton et al. | May 8, 1945 |